N. D. LEVIN.
LOCOMOTIVE.
APPLICATION FILED SEPT. 25, 1912.
1,132,727.
Patented Mar. 23, 1915.
2 SHEETS—SHEET 1.
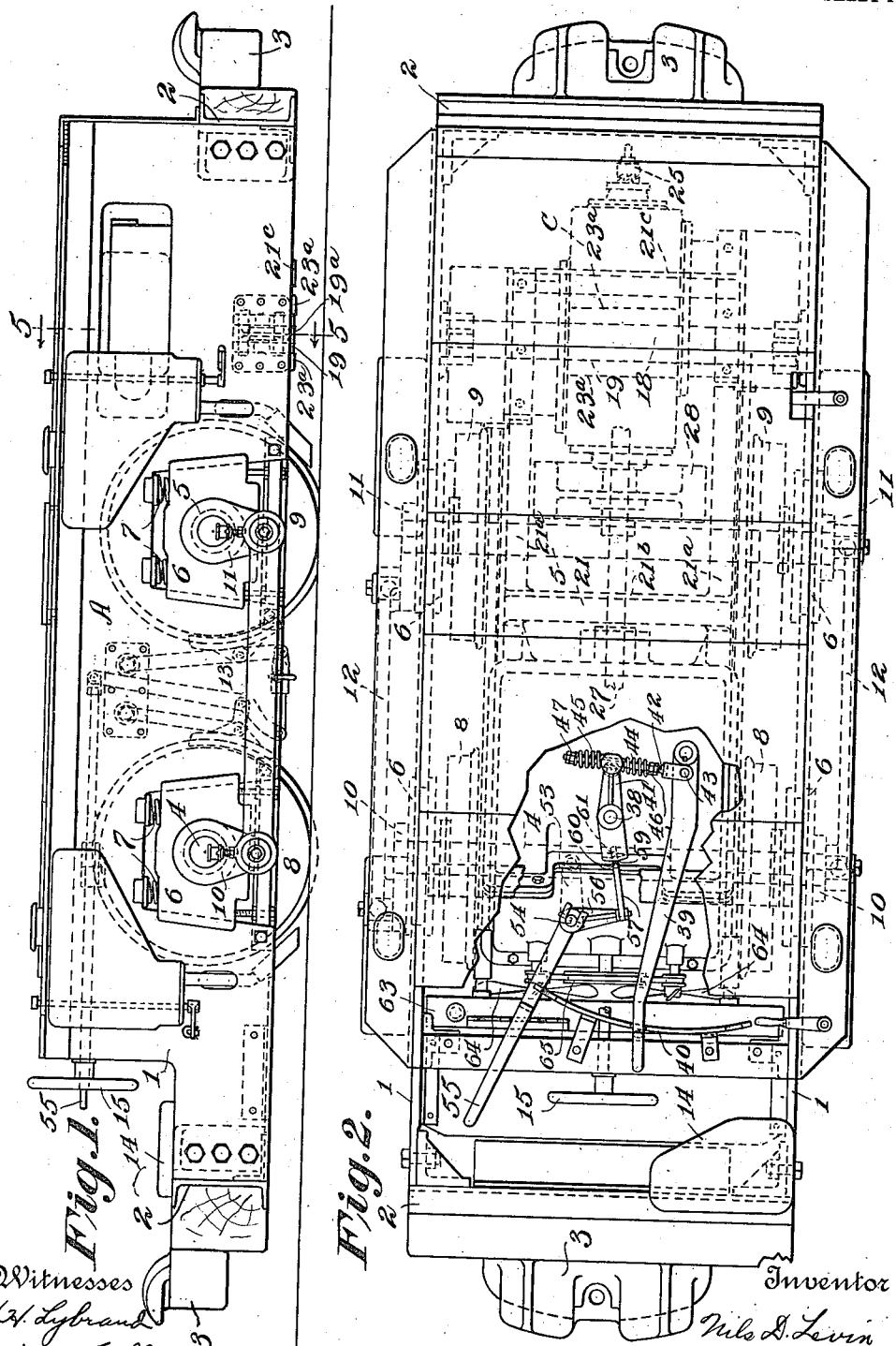

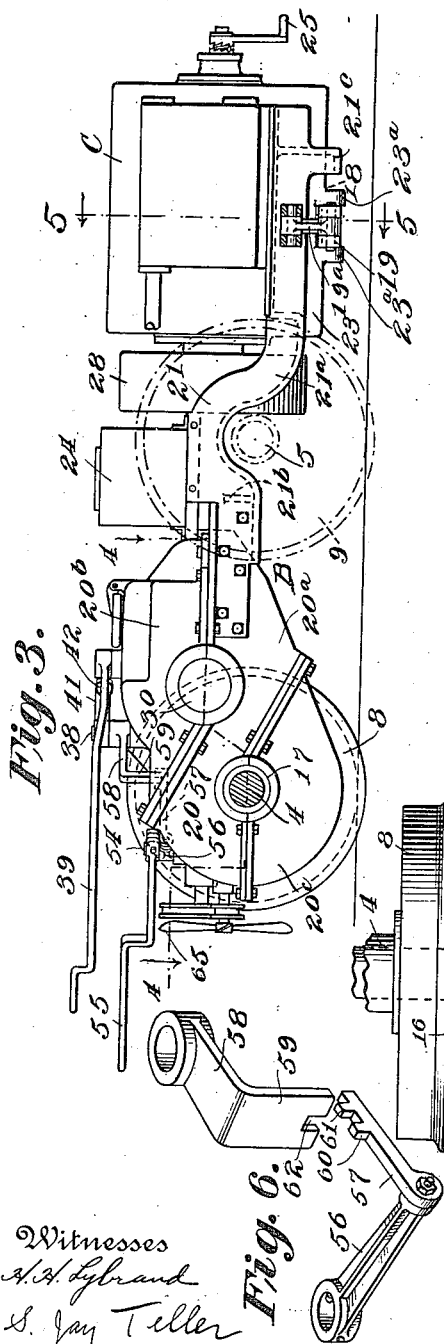
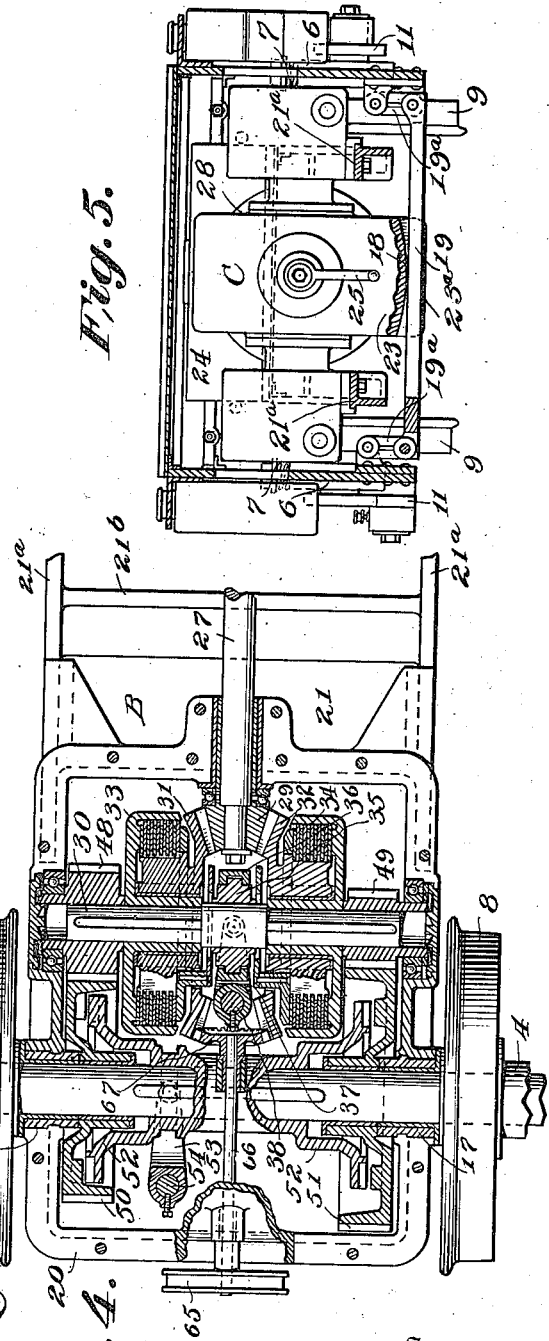

UNITED STATES PATENT OFFICE.

NILS D. LEVIN, OF COLUMBUS, OHIO, ASSIGNOR TO THE JEFFREY MANUFACTURING COMPANY, OF COLUMBUS, OHIO, A CORPORATION OF OHIO.

LOCOMOTIVE.

1,132,727. Specification of Letters Patent. Patented Mar. 23, 1915.

Application filed September 25, 1912. Serial No. 722,281.

*To all whom it may concern:*

Be it known that I, NILS D. LEVIN, a citizen of the United States, residing at Columbus, in the county of Franklin and State of Ohio, have invented certain new and useful Improvements in Locomotives, of which the following is a specification, reference being had therein to the accompanying drawings.

This invention relates to improvements in locomotives and especially in small locomotives such as are adapted for use in the buildings and yards of manufacturing plants and in and about mines such as coal mines.

A locomotive embodying my improvements is especially adapted to be driven by means of a gasolene or other internal combustion motor. However, so far as certain features of my invention are concerned, the particular kind of motor is immaterial.

The principal object of the invention is to provide an improved mounting for the power plant including the transmission gearing.

Another object is to provide improved transmission gearing and improved controlling mechanism.

Still further objects are to provide certain improved details of construction and arrangements of parts which are fully set forth in the following specification and claims.

Referring to the drawings which illustrate one embodiment of the invention, Figure 1 is a side elevation of a locomotive embodying my invention. Fig. 2 is a plan view, a portion of the cover plate being broken away in order that certain of the parts may be more clearly shown. Fig. 3 is a side view of the locomotive power plant and transmission gearing, the near wheels and the main frame being omitted for the sake of clearness. Fig. 4 is a sectional view taken along the line 4—4 of Fig. 3. Fig. 5 is a sectional view taken along the lines 5—5 of Figs. 1 and 3. Fig. 6 is a detail perspective view of the interlocking devices for the clutches.

Referring to the drawings, A represents as a whole the main frame of the locomotive. This frame is preferably made up chiefly of structural steel parts, each side element 1 preferably comprising a single metal sheet, and each end element 2 preferably comprising pling devices 3, 3 are secured to the end sections of the frame.

4 and 5 are two axles upon which the main frame is resiliently supported by means of bearing boxes 6, and springs 7. The bearing boxes which I have shown have features of novelty but as these bearing boxes are the invention of another, they need not here be described in detail.

8, 8 and 9, 9 are track wheels secured to the axles 4 and 5. Cranks 10, 10 and 11, 11 are provided at the ends of the axles and connecting rods 12, 12 serve to connect the cranks of the two axles and to transmit power from one axle to the other.

A suitable brake mechanism is provided for the track wheels, this brake mechanism being indicated as a whole by 13. At one end of the locomotive there is provided a compartment for the locomotive operator, this compartment having a seat 14. A hand wheel 15 is provided within reach of an operator on the seat 14 and by means of the hand wheel the brakes can be applied or released.

The power plant as a whole is mounted upon a framework B which can be considered as one rigid integral whole, although preferably made up for the sake of convenience of several separate parts. This framework B has at one end two separated points of support at 16 and 17, on one of the axles, as for instance, 4, and at the other end it has a single central point of support at 18, preferably upon a suitable cross bar 19, which will be fully described.

The frame B preferably comprises at one end a casing 20 which has bearings upon the axle 4 at the points 16 and 17 before mentioned. This casing 20 as shown comprises three sections separable along horizontal and inclined lines, the main central section 20$^a$ being supported directly on the axle, and the upper and lower sections 20$^b$ and 20$^c$ being connected to the central section in a manner to permit removal for the purposes of inspecting, cleaning, repairing or removing the parts inside the casing. Connected to the central section 20$^a$ of the casing 20 is a preferably integral frame 21 which is arched over the axle 5 and extends to points at the other end of the locomotive. This frame has side elements 21$^a$, 21$^a$ and cross elements 21$^b$, 21$^c$. The frame 21 is conmotor C which is indicated in the drawings as an internal combustion engine. The engine frame is provided with a depending boss 23 having a transversely convex bearing surface at 18. The boss 23 is provided with depending flanges 23ª between which lies the cross bar 19 which engages the surface 18 and supports the frame B and the motor C. The cross bar 19 is supported at its ends by means of vertical links 19ª which are pivoted at their lower ends to the cross bar and at their upper ends to suitable bosses or brackets on the main locomotive frame.

The motor or engine C which I have shown more or less diagrammatically in the drawings preferably has two sets of opposed cylinders and is preferably arranged with its crank shaft extending longitudinally of the locomotive. I have selected an engine of this type for the reason that its vertical dimensions are small, the engine being on this account well adapted for a locomotive intended for use in places where head room is at a premium. As shown the motor is provided with a tank 24 mounted on the central part of the frame B from which liquid fuel is supplied, and with a crank 25 for starting. The usual devices for vaporizing the fuel and for controlling the engine are provided.

27 is a transmission shaft which is either connected to or formed as part of the crank shaft of the motor C. Mounted upon this transmission shaft 27 is a fly wheel 28. At the end of the shaft 27 within the casing 20 there is a bevel pinion 29.

30 is a transverse shaft rotatably mounted in suitable bearings in the walls of the casing 20.

31 and 32 are two bevel gears mounted on the shaft 30 for free rotation with respect thereto and arranged to mesh with the pinion 29 at the end of the shaft 27. Clutches 33 and 34 are provided by means of which the gears 31 and 32 can be connected to the shaft 30. In the drawings I have shown friction disk clutches but clutches of some other type can be used if preferred.

35 is a collar slidable on the shaft 30 and provided with an annular tongue adapted to fit within a corresponding groove in another collar 36. The collar 36 has trunnions which are engaged by forks 37 on the vertical rock shaft 38. It will be obvious that when the shaft is rocked the collars will be moved to the right or left and that the disks of the corresponding clutch thrown into forced engagement for the transmission of power.

For operating the rock shaft 38 I provide a hand lever 39 within reach of the operator. Preferably a notched segment 40 is provided for locking the lever in any one of three positions. Secured to the upper end of the rock shaft is a lever 41 provided with an opening at its outer end through which loosely extends a link 42 which is pivoted at 43 to the lever 39. Two springs 44 and 45 surround the link 42 on opposite sides of the lever 41. These springs are connected with the link 42 by means of suitable nuts and washers at 46 and 47. It will be obvious that by shifting the lever 39 force can be resiliently transmitted through the link 42 and the springs 44 and 45 to the lever 41 which acts through the rock shaft 38 and the other devices which have been described to throw the clutches. When the parts are in the central positions shown in the drawings both of the clutches will be disengaged. When the lever 39 is thrown to one side, one clutch will be engaged and when it is thrown to the other side, the other clutch will be engaged. The springs 44 and 45 serve to insure the application to the clutch disks of a proper amount of pressure when the hand lever is in the proper position and at the same time prevent an undue amount of pressure being applied.

48 and 49 are two spur pinions of different sizes keyed to the shaft 30.

50 and 51 are spur gears mounted upon the axle 4 and adapted to mesh respectively with the pinions 48 and 49. The gears 50 and 51 are freely rotatable on the axle 4 but can be connected thereto by means of a sliding sleeve or collar 52 which is provided at its end with teeth adapted to engage with corresponding teeth on the gears. This collar 52 is splined to the axle 4 and can be moved to bring its teeth into engagement with one or the other of the gears 50 and 51 by means of a forked lever 53 connected to a vertical rock shaft 54 which carries at its upper end a hand lever 55. By means of this lever the operator can connect either of the gears 50 and 51 with the axle.

Preferably I provide means for preventing the throwing of the clutch collar 52 when either of the clutches 33 and 34 is engaged for the transmission of power. The means for this purpose which I have shown in the drawings comprises an arm 56 carried by the rock shaft 54 and a link 57 pivotally secured to the end of the arm. Mounted upon the rock shaft 38 and preferably formed as an extension of the lever 41 is an arm 58 which is provided with a depending arcuate flange 59 concentric with the rock shaft. The link 57 has two upstanding teeth 60, 61, which are so positioned that when the lever 55 is in a central position, they embrace the arcuate flange 59. The clutch 59 has a notch 62 which is so positioned that when the lever 39 is in a central neutral position that the teeth 60 and 61 can pass through it. It will be clear that when the lever 39 is in the central position shown the lever 55 can be thrown in either direction to connect either of the gears 50 and 51 to the axle. It will also be clear that when the lever 39 has been thrown in either direction to cause the engagement of either friction clutch, the notch 62 will be out of alinement with the teeth 60 and 61 and the flange 59 by engaging one or both of the teeth will prevent movement of the lever 55 to either connect or disconnect the gears 50 and 51. By means of this lock mechanism I have made it impossible for an operator to connect the track wheels with the motor by means of the clutch sleeve 52. In every case this clutch sleeve must be first moved into the desired position and then the power connection must be made by means of one of the clutches 33 and 34.

I prefer to provide a water cooling system for the motor 23 and as shown this system comprises a radiator 63 which is connected to the motor by means of suitable pipes. For drawing air through the radiator to effect the cooling of the water, I provide fans 64, 64 which are preferably mounted on stud shafts extending from the end wall of the casing 20. The fans can be driven by means of belts from a pulley 65 on a shaft 66 which is mounted in alinement with the power shaft 27 in suitable bearings formed in the casing 20. This shaft 66 is driven by means of a bevel gear 67 which meshes with the two bevel gears 31 and 32 on the shaft 30.

In operation the motor 23 is started and allowed to run continuously. It being assumed that one of the gears 50 or 51 is connected to the axle 4, power can be transmitted from the motor to the axle by throwing into engagement one of the clutches 33 or 34. When one clutch is thrown in the locomotive will be driven in one direction, and when the other clutch is thrown in the locomotive will be driven in the other direction. On account of the difference in sizes of the pinions 48 and 49 and the gears 50 and 51 the speed of the locomotive can be changed by momentarily throwing out the friction clutch and disconnecting one gear from the axle and connecting the other. The locomotive can therefore be driven in either direction at either of two speeds. On account of the connection between the two sets of drive wheels, the entire weight of the locomotive is available to give tractive force.

By providing a motor with horizontally arranged cylinders and by locating the motor at the other end of the locomotive from that at which the transmission gearing is located, it has been possible for me to construct a locomotive the vertical dimensions of which are relatively small. The mounting of the power plant upon three triangularly arranged points of support makes possible the free movement of the main frame over uneven tracks without disturbing the relative positions of the motor and transmission parts, these being held in fixed relation to each other by the rigid frame B. The supporting by means of links of the cross bar 19, upon which the rear end of the power plant frame rests, permits the rear end of the power plant and power plant frame to be freely movable laterally within certain narrow limits so that there will be no tendency for the power transmitting elements to be cramped in case of movement of the main frame longitudinally of the rear axle as the locomotive makes a turn or passes over rough and uneven tracks.

What I claim is:

1. In a locomotive, the combination of a main frame, axles and track wheels upon which the frame is resiliently mounted, a rigid auxiliary frame having at one end bearings upon one of the axles at relatively widely separated points, means secured to the main frame but laterally movable with respect thereto for supporting the other end of the auxiliary frame at a single point, a motor on the auxiliary frame, and gearing on the auxiliary frame connecting the motor and the axle upon which one end of the auxiliary frame is supported.

2. In a locomotive, the combination of a main frame, axles and track wheels upon which the frame is resiliently mounted, a rigid auxiliary frame having at one end bearings upon one of the axles at relatively widely separated points, means connected with the main frame for flexibly supporting the other end of the auxiliary frame at a single point on the side of the second axle opposite to that on which the first axle is located, a motor on the auxiliary frame at the said opposite side of the second axle, and gearing on the auxiliary frame connecting the motor and the first axle.

3. In a locomotive, the combination of a main frame, axles and track wheels upon which the frame is resiliently mounted, a rigid auxiliary frame having at one end bearings upon one of the axles at relatively widely separated points, means connected with the main frame for flexibly supporting the other end of the auxiliary frame at a single point on the side of the second axle opposite to that on which the first axle is located, a motor on the auxiliary frame at the said opposite side of the second axle, gearing on the auxiliary frame connecting the motor and the first axle, and means for operatively connecting the two axles.

4. In a locomotive, the combination of a main frame, axles and track wheels upon which the frame is resiliently mounted, a rigid auxiliary frame having at one end bearings upon one of the axles at relatively widely separated points, means connected with the main frame for flexibly supporting the other end of the auxiliary frame at the side of the second axle opposite to that on which the first axle is located, a motor on the auxiliary frame at the said opposite side of the second axle, and gearing on the auxiliary frame connecting the motor and the first axle.

5. In a locomotive, the combination of a main frame, axles and track wheels upon which the frame is resiliently mounted, a rigid auxiliary frame having at one end bearings upon one of the axles at relatively widely separated points, means connected with the main frame for flexibly supporting the other end of the auxiliary frame at the side of the second axle opposite to that on which the first axle is located, a motor on the auxiliary frame at the said opposite side of the second axle, with its lower parts below the level of the axle, and gearing on the auxiliary frame connecting the motor and the first axle.

6. In a locomotive, the combination of a main frame, axles and track wheels upon which the frame is resiliently mounted, a rigid auxiliary frame having at one end bearings upon one of the axles at relatively widely separated points, means connected with the main frame for flexibly supporting the other end of the auxiliary frame at the side of the second axle opposite to that on which the first axle is located, a motor on the auxiliary frame at the said opposite side of the second axle, gearing on the auxiliary frame connecting the motor and the first axle, and means for operatively connecting the two axles.

7. In a locomotive, the combination of a main frame, axles and track wheels upon which the frame is resiliently mounted, a rigid auxiliary frame having at one end bearings upon one of the axles at relatively widely separated points, means connected with the main frame for flexibly supporting the other end of the auxiliary frame at the side of the second axle opposite to that on which the first axle is located, a motor on the auxiliary frame at the said opposite side of the second axle with its lower parts below the level of the axle, gearing on the auxiliary frame connecting the motor and the first axle, and means for operatively connecting the two axles.

In testimony whereof I affix my signature, in presence of two witnesses.

NILS D. LEVIN.

Witnesses:
E. A. F. MULLIN,
DUDLEY T. FISHER.